US012763369B2

(12) United States Patent
Kim et al.

(10) Patent No.: US 12,763,369 B2
(45) Date of Patent: Oct. 13, 2026

(54) ELECTROLYTE SOLUTION FOR LITHIUM SECONDARY BATTERY AND LITHIUM SECONDARY BATTERY INCLUDING SAME

(71) Applicants: Hyundai Motor Company, Seoul (KR); Kia Corporation, Seoul (KR); Korea Advanced Institute of Science and Technology, Daejeon (KR)

(72) Inventors: Ko Eun Kim, Cheongju-si (KR); Sung Ho Ban, Hwaseong-si (KR); Yoon Sung Lee, Suwon-si (KR); Jun Ki Rhee, Suwon-si (KR); Hui Beom Nam, Hwaseong-si (KR); Hyeon Gyu Moon, Daejeon (KR); Nam-Soon Choi, Daejeon (KR); Jeong Woo Lee, Ulsan (KR); Sung You Hong, Ulsan (KR)

(73) Assignees: Hyundai Motor Company, Seoul (KR); Kia Corporation, Seoul (KR); Korea Advanced Institute of Science and Technology, Daejeon (KR)

(*) Notice: Subject to any disclaimer, the term of this patent is extended or adjusted under 35 U.S.C. 154(b) by 400 days.

(21) Appl. No.: 18/504,499

(22) Filed: Nov. 8, 2023

(65) Prior Publication Data

US 2024/0178450 A1 May 30, 2024

(30) Foreign Application Priority Data

Nov. 16, 2022 (KR) ........................ 10-2022-0153804

(51) Int. Cl.
*H01M 10/0567* (2010.01)
*C07F 7/18* (2006.01)
(Continued)

(52) U.S. Cl.
CPC ....... *H01M 10/0567* (2013.01); *C07F 7/1804* (2013.01); *H01M 10/0525* (2013.01); *H01M 10/4235* (2013.01); *H01M 2300/004* (2013.01)

(58) Field of Classification Search
CPC ......... H01M 10/0567; H01M 10/0525; H01M 10/4235; H01M 2300/004; H01M 4/386;
(Continued)

(56) References Cited

U.S. PATENT DOCUMENTS

2013/0071732 A1* 3/2013 Kobayashi ................ C07F 9/58 429/188

FOREIGN PATENT DOCUMENTS

CN 112086684 A 12/2020
KR 20190092149 A 8/2019

OTHER PUBLICATIONS

Kim, K., et al., "Electrolyte-Additive-Driven Interfacial Engineering for High-Capacity Electrodes in Lithium-Ion Batteries: Promise and Challenges," ACS Energy Lett. 2020, 5, 1537-1553, Apr. 7, 2020, 17 pages.

(Continued)

*Primary Examiner* — Daniel H Lee
(74) *Attorney, Agent, or Firm* — Slater Matsil, LLP

(57) ABSTRACT

An embodiment electrolyte solution includes a lithium salt, a solvent, and a functional additive, wherein the functional
(Continued)

additive includes 4-((tert-butoxydimethylsilyl)methyl)-5-methyl-1,3-dioxol-2-one represented by

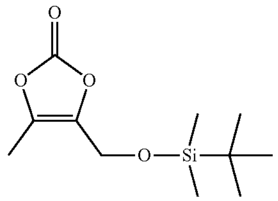

as an electrode film additive. An embodiment lithium secondary battery includes the above-described electrolyte solution, a positive electrode including a positive electrode active material including Ni, Co, and Mn, a negative electrode including a carbon-based negative electrode active material or a silicon-based negative electrode active material, and a separator interposed between the positive electrode and the negative electrode.

20 Claims, 3 Drawing Sheets

(51) Int. Cl.
*H01M 10/0525* (2010.01)
*H01M 10/42* (2006.01)

(58) Field of Classification Search
CPC ............... H01M 4/525; H01M 10/052; H01M 10/0568; H01M 10/0569; H01M 4/505; C07F 7/1804
See application file for complete search history.

(56) References Cited

OTHER PUBLICATIONS

Park, Sewon et al., "Replacing conventional battery electrolyte additives with dioxolone derivatives for high-energy-density lithium-ion batteries," Nature Communications, (2021) 12:838, https://doi.org./10.1038/s41467-021-21106-6, www.nature.com/naturecommunications, total pp. 12.

* cited by examiner

ELECTROLYTE SOLUTION FOR LITHIUM SECONDARY BATTERY AND LITHIUM SECONDARY BATTERY INCLUDING SAME

CROSS-REFERENCE TO RELATED APPLICATIONS

This application claims the benefit of Korean Patent Application No. 10-2022-0153804, filed on Nov. 16, 2022, which application is hereby incorporated herein by reference.

TECHNICAL FIELD

The present disclosure relates to an electrolyte solution for a lithium secondary battery and a lithium secondary battery including the same.

BACKGROUND

A lithium secondary battery is an energy storage device including a positive electrode supplying lithium, a negative electrode accepting the lithium, an electrolyte being a lithium-ion transport medium, and a separator separating the positive electrode and the negative electrode during charging. Due to the change in chemical potential caused by the intercalation and deintercalation of lithium ions at the positive electrode and the negative electrode, electrical energy can be produced and stored.

Such lithium secondary batteries have been mainly used in portable electronic devices. However, with recently commercialized electric vehicles (EVs) and hybrid electric vehicles (HEVs), lithium secondary batteries also have been used as means for storing energy in electric vehicles and hybrid electric vehicles.

On the other hand, lithium secondary battery performance is determined by the characteristics of the four core materials, which are the positive electrode, the negative electrode, the separator, and the electrolyte.

In particular, to accelerate the commercialization of eco-friendly electric vehicles, it is essential to increase cell unit energy density to improve mileage. In addition, low-cost, high-speed charging and discharging, and high-safety technologies are also essentially required.

In addition, the importance of low-viscosity solvents and additives contained in the electrolyte of lithium secondary batteries is being emphasized to enhance battery performance and stability related to power output.

Hence, research has been currently conducted on increasing the energy density of lithium secondary batteries to improve the mileage of electric vehicles, in which an increase in energy density can be obtained through high capacity of positive electrodes and negative electrodes.

To develop lithium secondary batteries with high energy density, development of new materials which can overcome the performance limitation of the existing lithium secondary battery materials, such as positive electrodes, negative electrodes, separators, and electrolyte solutions, is required.

In particular, battery energy density significantly depends on characteristics of positive electrode and negative electrode materials, and development of an electrolyte solution is required to be appropriately accompanied to enable the positive electrode and negative electrode materials to exhibit excellent electrochemical performance.

Even when high-capacity materials for positive electrodes and negative electrodes are developed, the remaining components on a surface of the positive electrode and a surface of the negative electrode accelerate the decomposition of an electrolyte solution, unless appropriate electrolyte solutions are used. In addition, there has been a problem in that degradation rate also increases according to an increase in interfacial reactivity between the electrolyte solution and the electrode, thereby deteriorating charging performance and discharging performance.

Therefore, interface engineering between electrodes and electrolyte solutions is highly important. To this end, demand for introducing additive technologies capable of forming electrochemical and chemically stable films is growing.

The description provided above is only for helping understanding the background of embodiments of the present disclosure and should not be construed as being included in the related art known by those skilled in the art.

SUMMARY

The present disclosure relates to an electrolyte solution for a lithium secondary battery and a lithium secondary battery including the same. Particular embodiments relate to an electrolyte solution capable of enhancing life cycle characteristics and power output characteristics of a high-capacity lithium secondary battery and to a lithium secondary battery including the same.

The present disclosure provides an electrolyte solution for a lithium secondary battery to improve life cycle characteristics and power output characteristics of a high-capacity lithium secondary battery and a lithium secondary battery including the same.

Technical features that can be achieved by embodiments of the present disclosure are not limited to those described above, and other technical features not described herein will be apparently understood by those skilled in the art from the present disclosure.

One embodiment of the present disclosure provides an electrolyte solution for a lithium secondary battery that includes a lithium salt, a solvent, and a functional additive, in which the functional additive includes 4-((tert-butoxydimethylsilyl)methyl)-5-methyl-1,3-dioxol-2-one represented by Formula 1 as an electrode film additive.

Formula 1

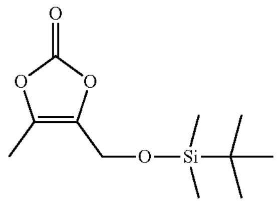 [SMILES: Cc1oc(=O)oc1CO[Si](C)(C)C(C)(C)C]

The electrode film additive may be included in an amount of 0.05% to 1.0% by weight with respect to a weight of the electrolyte solution.

Preferably, the electrode film additive is included in an amount of 0.05% to 0.5% by weight with respect to the weight of the electrolyte solution.

The functional additive may further include vinylene carbonate (VC) as a negative electrode film additive.

Preferably, the vinylene carbonate is included in an amount of 0.05% to 3.0% by weight with respect to the weight of the electrolyte solution.

The lithium salt may be one or a mixture of two or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$, LiFSI, and $(CF_3SO_2)_2NLi$.

The solvent may be one or a mixture of two or more selected from the group consisting of a carbonate-based solvent, an ester-based solvent, an ether-based solvent, and a ketone-based solvent.

On the other hand, according to one embodiment of the present disclosure, a lithium secondary battery includes the above-mentioned electrolyte solution. In addition, the lithium secondary battery may further include a positive electrode including a positive electrode active material including Ni, Co, and Mn, a negative electrode including one type or two or more types selected from a carbon-based negative electrode active material and a silicon-based negative electrode active material, and a separator interposed between the positive electrode and the negative electrode.

The positive electrode may contain Ni in an amount of 60% by weight or more.

According to embodiments of the present disclosure, an electrolyte solution enables formation of protective layers with high ion conductivity on a surface of a positive electrode active material and a surface of a negative electrode active material to prevent cell degradation. Hence, the life cycle, as well as the battery power output characteristics of a lithium secondary battery, can be improved.

In addition, life cycle stability at high temperatures can be achieved, thereby improving battery quality.

DETAILED DESCRIPTION OF ILLUSTRATIVE EMBODIMENTS

Figure 1:
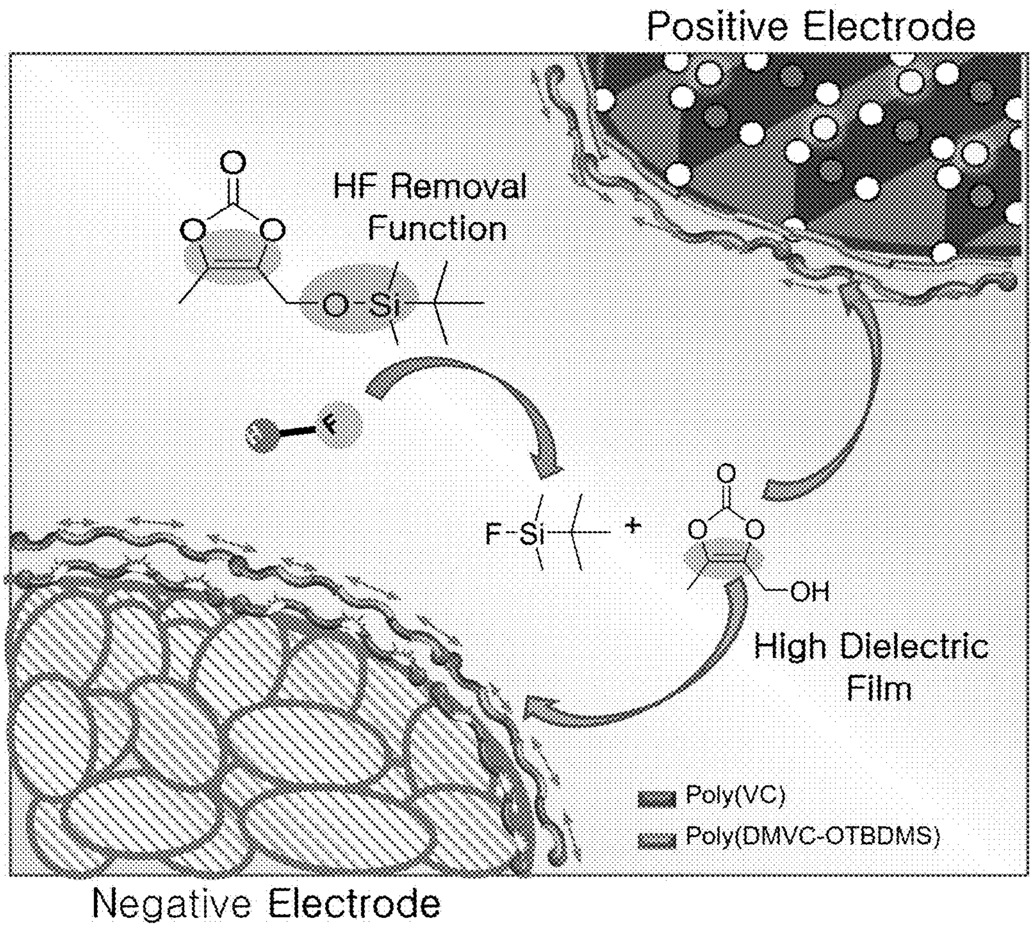
FIG. 1 is a diagram illustrating a functional mechanism of an electrode film additive according to one embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In embodiments of the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another. A singular representation may include a plural representation unless the context clearly indicates otherwise. It will be further understood that the terms "comprise", "include", "has", etc. when used in this specification specify the presence of stated features, integers, steps, operations, elements, components, and/or combinations thereof, but do not preclude the presence or addition of one or more other features, integers, steps, operations, elements, components, and/or combinations thereof.

According to one embodiment of the present disclosure, an electrolyte solution for a lithium secondary battery is a component forming an electrolyte applied to a lithium secondary battery and includes a lithium salt, a solvent, and a functional additive.

The lithium salt may be one or a mixture of two or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$, LiFSI, and $(CF_3SO_2)_2NLi$.

In this case, the electrolyte solution may include the lithium salt in a total amount in a concentration range of 0.1 M to 3.0 M, and preferably in the concentration range of 0.1 M to 1.2 M.

In addition, the solvent may be one or a mixture of two or more selected from the group consisting of a carbonate-based solvent, an ester-based solvent, an ether-based solvent, and a ketone-based solvent.

In this case, dimethyl carbonate (DMC), diethyl carbonate (DEC), dipropyl carbonate (DPC), methylpropyl carbonate (MPC), ethylpropyl carbonate (EPC), ethyl methyl carbonate (EMC), ethylene carbonate (EC), propylene carbonate (PC), butylene carbonate (BC), fluoroethylene carbonate (FEC), vinylene carbonate (VC), and the like may be used as the carbonate-based solvent. In addition, γ-butyrolactone (GBL), n-methyl acetate, n-ethyl acetate, n-propyl acetate, and the like may be used as the ester solvent, and dibutyl ether may be used as the ether-based solvent. Examples of the solvents are not particularly limited thereto.

In addition, the solvent may further include an aromatic hydrocarbon-based organic solvent. Specific examples of the aromatic hydrocarbon-based organic solvent include benzene, fluorobenzene, bromobenzene, chlorobenzene, cyclohexylbenzene, isopropylbenzene, n-butylbenzene, octylbenzene, toluene, xylene, mesitylene, and the like. In this case, the aromatic hydrocarbon-based organic solvent may be used either solely or in a combination.

On the other hand, according to one embodiment of the present disclosure, the functional additive includes 4-((tert-butoxydimethylsilyl)methyl)-5-methyl-1,3-dioxol-2-one (hereinafter, referred to as "DMVC-OTBDMS") represented by Formula 1 as an electrode film additive added to the electrolyte solution.

Formula 1

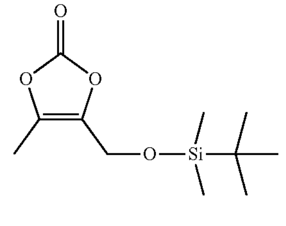 [SMILES: Cc1oc(=O)oc1CO[Si](C)(C)C(C)(C)C]

In this case, the electrode film additive, 4-((tert-butoxydimethylsilyl)methyl)-5-methyl-1,3-dioxol-2-one, enables formation of a high dielectric film playing a protective role on a surface of a positive electrode and a surface of a negative electrode.

FIG. 1 is a diagram illustrating a functional mechanism of an electrode film additive according to one embodiment of the present disclosure. A cathode electrolyte interphase (CEI) and a solid electrolyte interphase (SEI) that protect the surface of the positive electrode and the surface of the negative electrode, respectively are formed by adding the electrode film additive, 4-((tert-butoxydimethylsilyl)methyl)-5-methyl-1,3-dioxol-2-one, to the electrolyte solution. As a result, lithium ions are prevented from being electrodeposited on the surface of the positive electrode and the surface of the negative electrode while intercalation and deintercalation of lithium ions are facilitated at the positive electrode and the negative electrode.

In addition, the electrode film additive, DMVC-OTBDMS, improves high-temperature life cycle characteristics by removing HF produced by hydrolysis of the $LiPF_6$ salt through the introduction of a silane structure into the additive structure.

The electrode film additive, 4-((tert-butoxydimethylsilyl)methyl)-5-methyl-1,3-dioxol-2-one, may be included in an amount of 0.05% to 1.0% by weight with respect to a weight of the electrolyte solution. Preferably, the electrode film additive is included in an amount of 0.05% to 0.5% by weight with respect to the weight of the electrolyte solution.

When the amount of the electrode film additive is less than the above numerical range, there may be a problem in that the surface protective film is insufficiently formed on the surface of the positive electrode and the surface of the negative electrode, and the effect of enhancing high-temperature life cycle characteristics is thus negligible. On the contrary, when the amount of the electrode film additive is excessively large to exceed the above numerical range, there may be a problem in that the CEI and SEI, which are the surface protective layers for the positive electrode and the negative electrode, respectively are excessively thick, and cell resistance thus increases, resulting in deterioration of the life cycle of a cell.

On the other hand, the functional additive may further include a negative electrode film additive which serves a role of forming a film on the negative electrode in addition to the electrode film additive. For example, vinylene carbonate (hereinafter, referred to as "VC") may be used as the negative electrode film additive.

In this case, VC, used as the negative electrode film additive, is preferably included in an amount of 0.5% to 3.0% by weight with respect to the weight of the electrolyte solution. More preferably, the negative electrode film additive is included in an amount of 1.5% to 2.5% by weight.

When the amount of the negative electrode film additive is less than the above numerical range, there may be a problem in that long life cycle characteristics of the cell may be deteriorated. On the contrary, when the amount of the negative electrode film additive is excessively large to exceed the above numerical range, there may be a problem in that the surface protective layers are excessively thick, and cell resistance thus increases, resulting in the deterioration of battery power output.

On the other hand, according to one embodiment of the present disclosure, a lithium secondary battery includes the above-mentioned electrolyte solution as well as a positive electrode, a negative electrode, and a separator.

The positive electrode includes an NCM-based positive electrode active material including Ni, Co, and Mn. In particular, in one embodiment of the present disclosure, the positive electrode active material included in the positive electrode preferably includes the NCM-based positive electrode active material containing Ni only in an amount of 60% by weight or more.

In addition, the negative electrode includes one type or two or more types selected from a carbon-based negative electrode active material and a silicon-based negative electrode active material.

At least one selected from the group consisting of artificial graphite, natural graphite, graphitized carbon fibers, graphitized mesocarbon microbeads, fullerene, and amorphous carbon may be used as the carbon-based negative electrode active material.

In addition, the silicon-based negative electrode active material includes silicon oxide, silicon particles, silicon alloy particles, and the like.

On the other hand, each of the positive electrode active material and the negative electrode active material is mixed with a conductive additive, a binder, and a solvent to form an electrode slurry. Next, the electrode slurry is directly applied on each current collector and then dried to manufacture the positive electrode and negative electrode. In this case, Al may be used as the current collector but is not particularly limited thereto. Since a method of manufacturing such an electrode is widely known in the art, a detailed description thereof will be omitted herein.

The binder plays a role of well attaching each of the active material particles to each other or to the current collector. Examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like, but the binder is not particularly limited thereto.

In addition, the conductive additive is used to impart conductivity to the electrode. When constituting the conductive additive in the battery, any material that has electron conductivity and does not cause chemical change may be used. Examples of the conductive additive include natural graphite, artificial graphite, carbon black, acetylene black, Ketjen black, carbon fibers, metal powders such as copper, nickel, aluminum, silver, and the like, metal fibers, and the like. In addition, one or combinations of one or more conductive materials, such as polyphenylene derivatives, may be used.

The separator prevents a short circuit from occurring between the positive electrode and the negative electrode and provides movement passage for lithium ions. Well-known materials, such as polymer membranes of polyolefin-based such as polypropylene, polyethylene, polyethylene and polypropylene, polyethylene, polypropylene, and polyethylene, polypropylene, polyethylene, and polypropylene, or multimembranes thereof, microporous films, woven fabrics, and nonwoven fabrics, may be used as the separator. In addition, a porous polyolefin-based film coated with a resin having excellent stability may also be used.

Hereinafter, embodiments of the present disclosure will be described through Examples and Comparative Examples.

<Experiment 1>Capacity retention rate test at high temperature (45° C.) According to type and amount of functional additive.

To evaluate the high-temperature capacity retention rate characteristics of batteries according to types and amounts of functional additive added to an electrolyte solution, the capacity retention rate of each sample was measured after 100 cycles and 200 cycles of charging and discharging at a high temperature (45° C.) by varying the type and amount of the functional additive as shown in Table 1. The results thereof are shown in Table 1 and FIG. 2. Experiment 1 was performed under conditions: a cut-off voltage of 2.5 V to 4.2 V, a C-rate of 1 C, and a temperature of 45° C. To prepare an electrolyte solution, 1 M of LiPF o was used as a lithium salt, and a mixture of ethylene carbonate (EC), ethyl methyl carbonate (EMC), and diethyl carbonate (DEC) mixed in a volume ratio of 25:45:30 was used as a solvent.

The experiment was performed under a full-cell condition in which a positive electrode was based on a mixture of NCM811 and NCM622 and a negative electrode was based on graphite.

On the other hand, a commercialized additive, lithium difluorophosphate ($LiPO_2F_2$), was used in the Comparative Examples to form protective layers on a surface of the positive electrode and a surface of the negative electrode. In addition, a commercialized additive, vinylene carbonate (VC), was used to form a protective layer on a surface of the negative electrode.

TABLE 1

| | Additive (% by weight) | | | Life cycle capacity retention rate (%) | |
|---|---|---|---|---|---|
| Classification | DMVC-OTBDMS | $LiPO_2F_2$ | VC | after 100 cycles | after 200 cycles |
| Comparative Example 1 | — | — | — | 86.9 | 79.2 |
| Comparative Example 2 | — | — | 1.0 | 90.8 | 85.1 |
| Comparative Example 3 | — | 1.0 | 1.0 | 91.8 | 86.6 |
| Example 1 | 0.05 | — | 1.0 | 91.7 | 84.8 |
| Example 2 | 0.1 | — | 1.0 | 94.2 | 90.1 |
| Example 3 | 0.5 | — | 1.0 | 91.9 | 83.4 |
| Example 4 | 1.0 | — | 1.0 | 88.3 | 78.4 |
| Example 5 | 0.1 | — | — | 90.4 | 83.7 |

Figure 2:
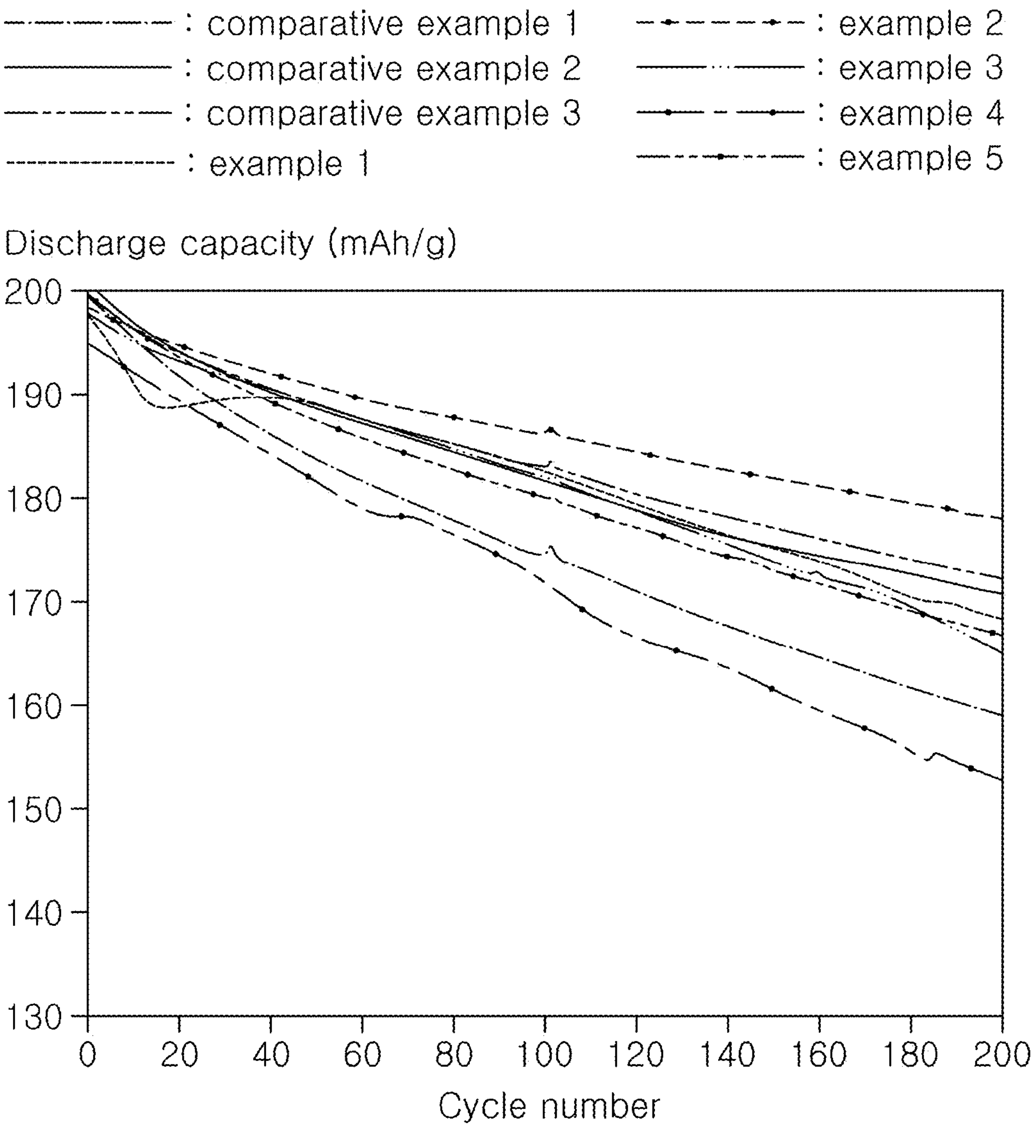
FIG. 2 is a graph showing experimental results for measuring high-temperature life cycle capacity retention rate of each of batteries of Examples and Comparative Examples according to types and amounts of functional additive.

First, as shown in Table 1 and FIG. 2, it was confirmed that the life cycle capacity retention rate of each of the batteries of Examples 1 to 5 in which 4-((tert-butoxydimethylsily)methyl)-5-methyl-1,3-dioxol-2-one (DMVC-OTBDMS), the functional additive according to embodiments of the present disclosure, was included in an amount of 0.05% to 1.0% by weight was higher than that of Comparative Example 1 in which no functional additive was included.

In particular, it was confirmed that the life cycle capacity retention rate of each of the batteries of Examples 1 to 3 in which DMVC-OTBDMS, the functional additive according to embodiments of the present disclosure, was included in an amount of 0.05% to 0.5% by weight was equivalent or superior to that of Comparative Example 2 in which the commercialized additive, VC, was solely included in an amount of 1.0% by weight and to that of Comparative Example 3 in which the commercialized additives, $LiPO_2F_2$ and VC, were each independently included in an amount of 1.0% by weight.

However, it was confirmed that the life cycle capacity retention rate of the battery of Example 4 in which DMVC-OTBDMS, the functional additive according to embodiments of the present disclosure, was included in an amount of 1.0% by weight was slightly decreased. As a result, it was confirmed that when DMVC-OTBDMS, the functional additive according to embodiments of the present disclosure, was included in an amount of more than 0.5% by weight, cell degradation was accelerated, thereby decreasing the life cycle capacity retention rate.

In addition, comparing Example 5 in which DMVC-OTBDMS, the functional additive according to embodiments of the present disclosure, was solely included in an amount of 0.1% by weight and Example 2 in which DMVC-OTBDMS, the functional additive according to embodiments of the present disclosure, and VC were each independently included in an amount of 1.0% by weight, it was confirmed that the battery of Example 2 was superior to that of Example 4 in terms of the life cycle capacity retention rate.

Therefore, when DMVC-OTBDMS, the functional additive according to embodiments of the present disclosure, was included in an amount of 0.05% to 1.0% by weight, it was confirmed that the battery exhibited the life cycle capacity retention rate of 88% or higher after 100 cycles of charging and discharging and the life cycle capacity retention rate of 78% or higher after 200 cycles of charging and discharging.

In particular, when DMVC-OTBDMS, the functional additive according to embodiments of the present disclosure, was included in an amount of 0.05% to 0.5% by weight, it was confirmed that the battery exhibited the life cycle capacity retention rate of 90% or higher after 100 cycles of charging and discharging and the life cycle capacity retention rate of 80% or higher after 200 cycles of charging and discharging.

<Experiment 2>Power Output Performance Test at Room Temperature (25° C.) According to Type and Amount of Functional Additive.

To evaluate the room-temperature power output characteristics of batteries according to types and amounts of functional additive added to an electrolyte solution, the power output performance of each sample was measured at room temperature (25° C.) by varying the type and amount of the functional additive as shown in Table 2. The results thereof are shown in Table 2 and FIG. 3. Experiment 2 was performed under conditions: a cut-off voltage of 2.5 V to 4.2 V, a temperature of 25° C., varying C-rates of 0.5 C, 1.0 C, 2.0 C, and 3.0 C for charging, and a C-rate of 0.5 C for discharging. To prepare an electrolyte solution, 0.5 M of $LiPF_6$ and 0.5 M of LiFSI were used as lithium salts, and a mixture of ethylene carbonate (EC), ethyl methyl carbonate (EMC), and diethyl carbonate (DEC) mixed in a volume ratio of 25:45:30 was used as a solvent.

The experiment was performed under a full-cell condition in which a positive electrode was based on a mixture of NCM811 and NCM622 was and a negative electrode was based on graphite.

Like Experiment 1, the commercialized additive, lithium difluorophosphate ($LiPO_2F_2$), was used in the Comparative Examples to form the protective layers on a surface of the positive electrode and a surface of the negative electrode. In addition, the commercialized additive, vinylene carbonate (VC), was used to form the protective layer on the surface of the negative electrode.

TABLE 2

| | Additive (wt %) | | | Power output performance (%) | | |
|---|---|---|---|---|---|---|
| | DMVC- | | | at xC vs. 0.5 C | | |
| Classification | OTBDMS | $LiPO_2F_2$ | VC | at 1 C | at 2 C | at 3 C |
| Comparative Example 1 | — | — | — | 96.3 | 86.8 | 75.6 |
| Comparative Example 2 | — | — | 1.0 | 96.6 | 84.9 | 72.9 |
| Comparative Example 3 | — | 1.0 | 1.0 | 95.6 | 86.0 | 76.3 |
| Example 1 | 0.05 | — | 1.0 | 96.1 | 87.8 | 78.8 |
| Example 2 | 0.1 | — | 1.0 | 95.8 | 87.4 | 78.1 |
| Example 3 | 0.5 | — | 1.0 | 95.7 | 87.0 | 77.3 |
| Example 4 | 1.0 | — | 1.0 | 95.8 | 86.3 | 74.9 |
| Example 5 | 0.1 | — | — | 86.6 | 88.4 | 77.9 |

Figure 3:
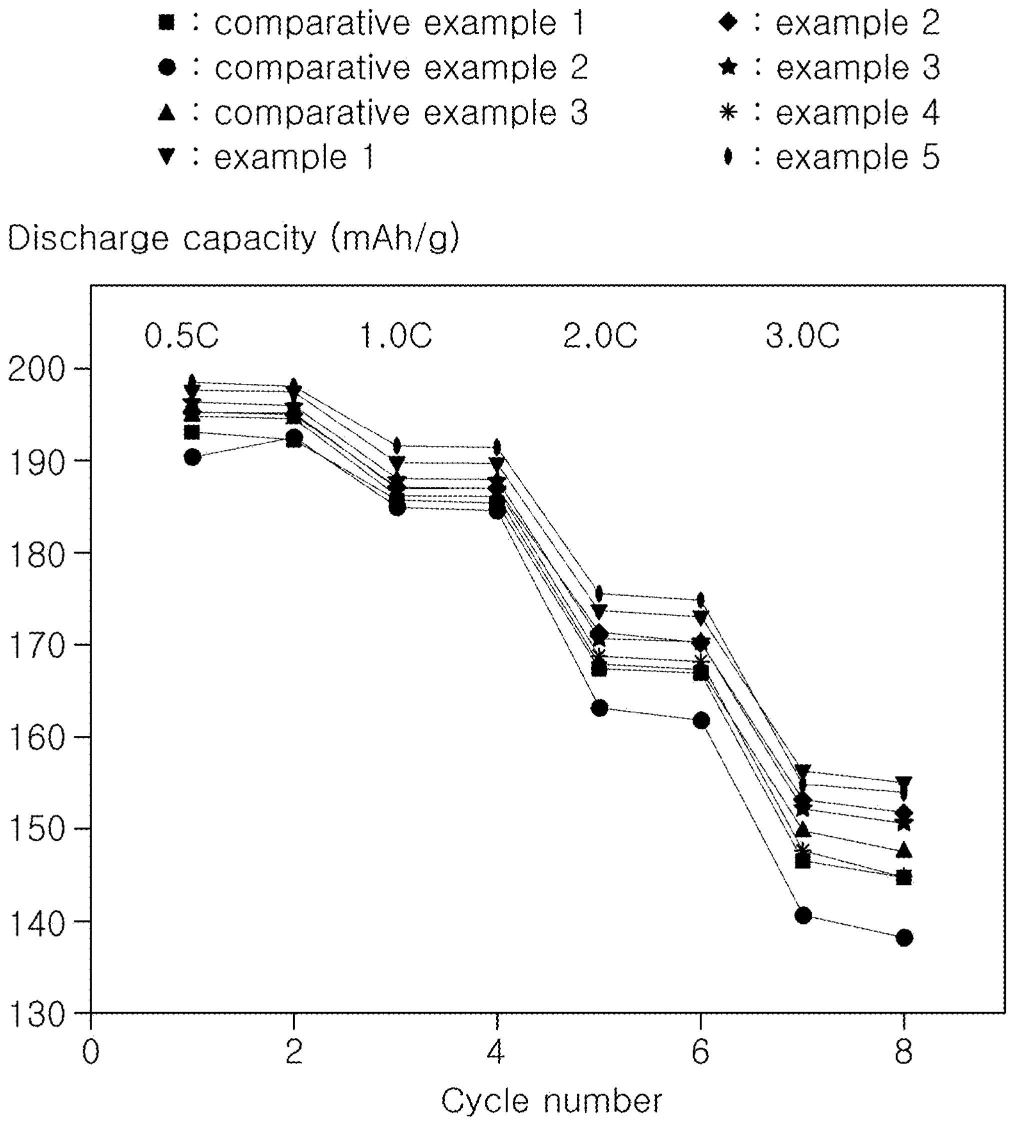
FIG. 3 is a graph showing experimental results for measuring room-temperature power output performance of each of batteries of Examples and Comparative Examples according to types and amounts of functional additive.

As shown in Table 2 and FIG. 3, it was confirmed that the power output performance of each of the batteries of Examples 1 to 4 in which 4-((tert-butoxydimethylsilyl)methyl)-5-methyl-1,3-dioxol-2-one (DMVC-OTBDMS), the functional additive according to embodiments of the present disclosure, was included in an amount of 0.05% to 1.0% by weight was equivalent or superior to that of Comparative Example 2 in which the commercialized additive VC was solely included in an amount of 1.0% by weight.

In particular, it was confirmed that the power output performance of each of the batteries of Examples 1 to 3 in which DMVC-OTBDMS, the functional additive according to embodiments of the present disclosure, was included in an amount of 0.05% to 0.5% by weight was equivalent or superior to that of Comparative Example 3 in which $LiPO_2F_2$, known as an additive effectively enhancing power output performance, and VC were each independently included in an amount of 1.0% by weight.

In addition, it was confirmed that the power output performance of the battery of Example 5 in which DMVC-OTBDMS, the functional additive according to embodiments of the present disclosure, was included in an amount of 0.1% by weight was equivalent or superior to that of Comparative Example 1 in which no functional additive was included.

Therefore, considering the high-temperature life cycle capacity characteristics and the room-temperature power output performance, it was confirmed that at least one of the life cycle capacity characteristics or power output performance of the battery in which DMVC-OTBDMS, the functional additive according to embodiments of the present disclosure, was included in an amount of 0.05% to 1.0% by weight was equivalent or superior to that of the battery in which no functional additive was included, or the commercialized additive, VC, was solely included, or the commercialized additive, $LiPO_2F_2$, was included in addition to VC, as seen in experiments.

In particular, to enhance both of the high-temperature life cycle capacity characteristics and the room-temperature power output performance, it was confirmed that DMVC-OTBDMS, the functional additive according to embodiments of the present disclosure, was preferably included in an amount of 0.05% to 0.5% by weight.

In addition, it was confirmed that DMVC-OTBDMS, the functional additive according to embodiments of the present disclosure, was capable of enhancing high-temperature life cycle capacity characteristics while maintaining the equal or excellent room-temperature power output performance without using other additives.

Although the present disclosure has been described with reference to the preferred embodiments and the accompanying drawings, the scope of the present disclosure is not limited thereto and is defined only by the accompanying claims and their equivalents if appropriate. Therefore, those skilled in the art will appreciate that various modifications, additions, and substitutions are possible, without departing from the scope and spirit of the present disclosure as described in the accompanying claims.

What is claimed is:

1. An electrolyte solution comprising:

a lithium salt;

a solvent; and a functional additive, wherein the functional additive comprises 4-((tert-butoxydimethylsilyl)methyl)-5-methyl-1,3-dioxol-2-one represented by

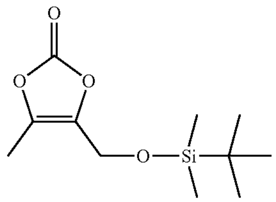 [SMILES: Cc1oc(=O)oc1CO[Si](C)(C)C(C)(C)C]

as an electrode film additive.

2. The electrolyte solution of claim 1, wherein the electrode film additive is included in an amount of 0.05% to 1.0% by weight with respect to a weight of the electrolyte solution.

3. The electrolyte solution of claim 2, wherein the electrode film additive is included in an amount of 0.05% to 0.5% by weight with respect to the weight of the electrolyte solution.

4. The electrolyte solution of claim 1, wherein the functional additive further comprises vinylene carbonate (VC) as a negative electrode film additive.

5. The electrolyte solution of claim 4, wherein the vinylene carbonate is included in an amount of 0.05% to 3.0% by weight with respect to a weight of the electrolyte solution.

6. The electrolyte solution of claim 1, wherein the lithium salt comprises one or a mixture of two or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$, LiFSI, and $(CF_3SO_2)_2NLi$.

7. The electrolyte solution of claim 1, wherein the solvent comprises one or a mixture of two or more selected from the group consisting of a carbonate-based solvent, an ester-based solvent, an ether-based solvent, and a ketone-based solvent.

8. A lithium secondary battery comprising:
a first electrode;
a second electrode; and
an electrolyte solution disposed between the first electrode and the second electrode, the electrolyte solution comprising:
a lithium salt;
a solvent; and
a functional additive, wherein the functional additive comprises 4-((tert-butoxydimethylsilyl)methyl)-5-methyl-1,3-dioxol-2-one represented by

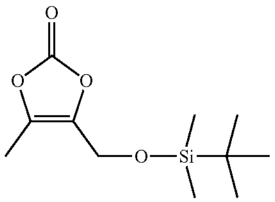 [SMILES: Cc1oc(=O)oc1CO[Si](C)(C)C(C)(C)C]

as an electrode film additive.

9. The lithium secondary battery of claim 8, wherein the electrode film additive is included in an amount of 0.05% to 1.0% by weight with respect to a weight of the electrolyte solution.

10. The lithium secondary battery of claim 9, wherein the electrode film additive is included in an amount of 0.05% to 0.5% by weight with respect to the weight of the electrolyte solution.

11. The lithium secondary battery of claim 8, wherein the functional additive further comprises vinylene carbonate (VC) as a negative electrode film additive in an amount of 0.05% to 3.0% by weight with respect to a weight of the electrolyte solution.

12. The lithium secondary battery of claim 8, wherein the lithium salt comprises one or a mixture of two or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$, LiFSI, and $(CF_3SO_2)_2NLi$.

13. The lithium secondary battery of claim 8, wherein the solvent comprises one or a mixture of two or more selected from the group consisting of a carbonate-based solvent, an ester-based solvent, an ether-based solvent, and a ketone-based solvent.

14. A lithium secondary battery comprising:
a positive electrode comprising a positive electrode active material comprising Ni, Co, and Mn;
a negative electrode comprising a carbon-based negative electrode active material or a silicon-based negative electrode active material;
a separator interposed between the positive electrode and the negative electrode; and
an electrolyte solution disposed between the positive electrode and the negative electrode, the electrolyte solution comprising:
a lithium salt;
a solvent; and
a functional additive, wherein the functional additive comprises 4-((tert-butoxydimethylsilyl)methyl)-5-methyl-1,3-dioxol-2-one represented by

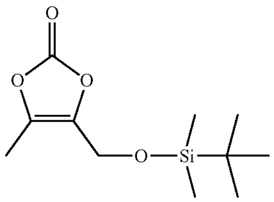

as an electrode film additive.

15. The lithium secondary battery of claim 14, wherein the positive electrode comprises Ni in an amount of 60% by weight or more.

16. The lithium secondary battery of claim 14, wherein the electrode film additive is included in an amount of 0.05% to 1.0% by weight with respect to a weight of the electrolyte solution.

17. The lithium secondary battery of claim 16, wherein the electrode film additive is included in an amount of 0.05% to 0.5% by weight with respect to the weight of the electrolyte solution.

18. The lithium secondary battery of claim 14, wherein the functional additive further comprises vinylene carbonate (VC) as a negative electrode film additive in an amount of 0.05% to 3.0% by weight with respect to a weight of the electrolyte solution.

19. The lithium secondary battery of claim 14, wherein the lithium salt comprises one or a mixture of two or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$, LiFSI, and $(CF_3SO_2)_2NLi$.

20. The lithium secondary battery of claim 14, wherein the solvent comprises one or a mixture of two or more selected from the group consisting of a carbonate-based solvent, an ester-based solvent, an ether-based solvent, and a ketone-based solvent.

* * * * *